March 7, 1967
O. H. WINN
3,308,457
RADAR TRACKING AMPLIFYING SYSTEM
Filed July 23, 1951
3 Sheets-Sheet 1
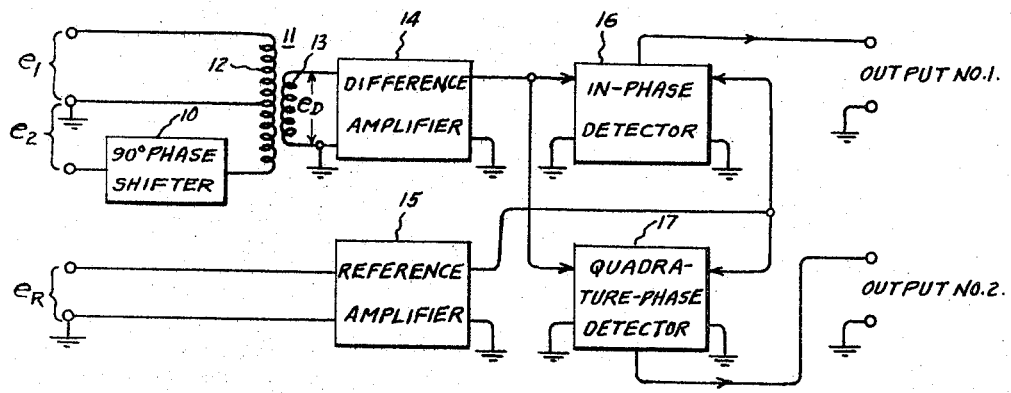
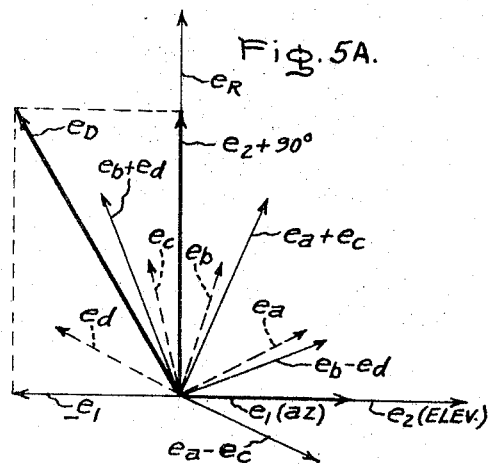
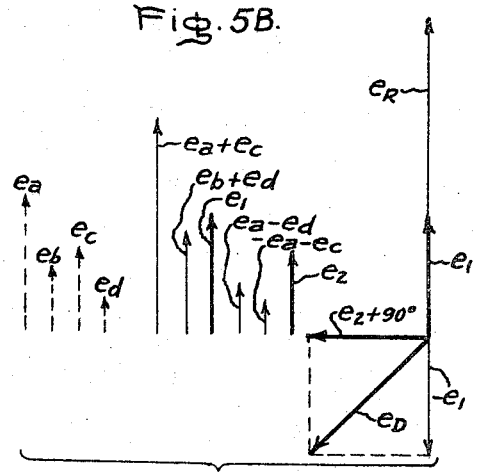
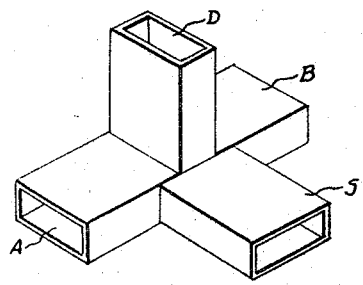
Inventor:
Oliver H. Winn,
by *Merton D. Moore*
His Attorney.

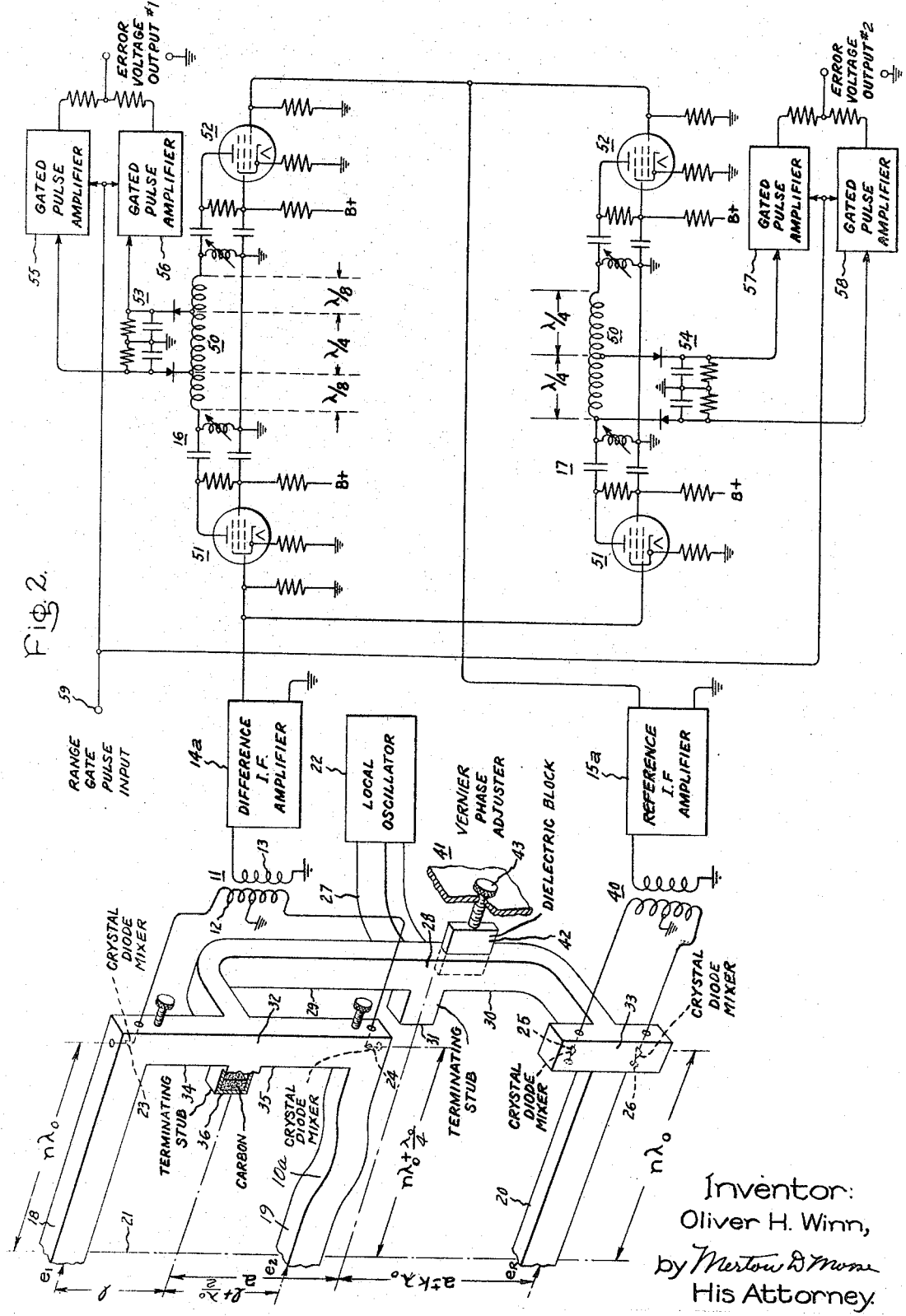

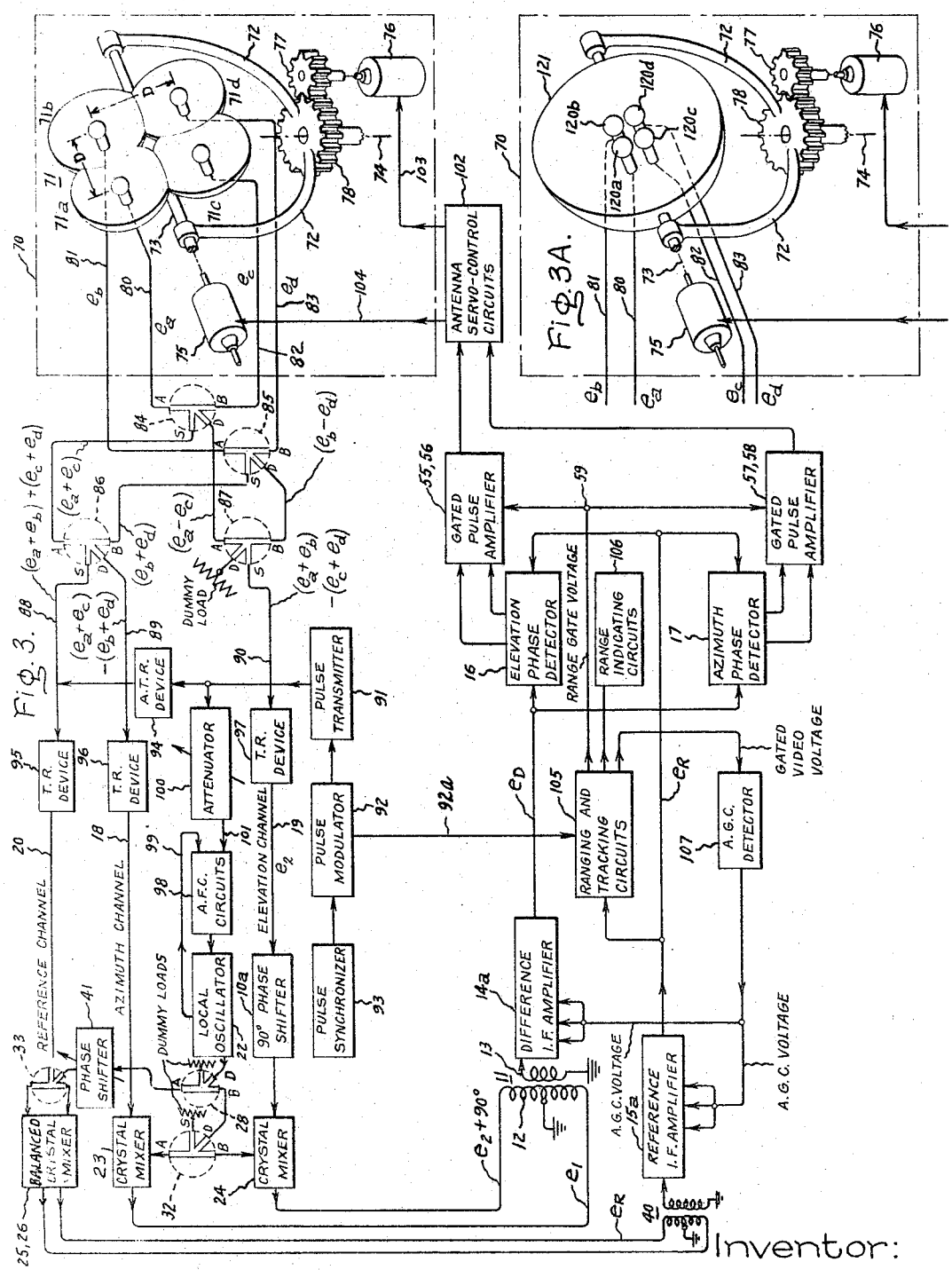

United States Patent Office 3,308,457
Patented Mar. 7, 1967

3,308,457
RADAR TRACKING AMPLIFYING SYSTEM
Oliver H. Winn, Camillus, N.Y., assignor to General Electric Company, a corporation of New York
Filed July 23, 1951, Ser. No. 238,112
7 Claims. (Cl. 343—7.4)

My invention relates to radar tracking systems, particularly systems of the monopulse type, for determining the position of a remote reflecting object. In its broader aspects, my invention is also applicable to an improved high frequency amplifying system, having particular utility in such a radar system, which permits two independent voltage waves to be simultaneously translated through a single amplifying channel.

It is a principal object of my invention to provide an improved radar tracking system.

Another object of my invention is to provide an improved monopulse radar tracking system which is simpler in construction than certain similar systems heretofore proposed and which possesses a high degree of accuracy.

Yet another object of my invention is to provide an improved radar system of the monopulse type for providing precision tracking of a target in azimuth and elevation.

It is a more specific object of my invention to provide an improved monopulse radar tracking system for automatically tracking a remote reflecting object.

Still another object of my invention is to provide an improved amplifying system for sismultaneously amplifying two independent alternating signal waves in a single amplifying channel, and for deriving two voltages from the output of said amplifier which are respective functions of the two waves.

A still further object of my invention is to provide an improved two-phase amplifying system particularly suited for use in a monopulse radar tracking system.

For additional objects and advantages, and for a better understanding of my invention, attention is now directed to the following description and accompanying drawings. The features of my invention which are believed to be novel are particularly pointed out in the appended claims.

In the drawings:

FIG. 1 is a simplified schematic block diagram of an amplifying system, illustrating certain fundamental principles underlying my invention;

FIG. 2 is a fragmentary schematic diagram of a portion of a monopulse radar system, corresponding generally to the block diagram of FIG. 1;

FIG. 3 is a simplified schematic block diagram of a complete monopulse tracking system, of the phase-comparison type, for automatically tracking a target in azimuth and elevation;

FIG. 3A illustrates a modified form of the antenna system shown within the dashed-rectangle in FIG. 3, which converts the system of FIG. 3 to a monopulse system of the amplitude-comparison type;

FIG. 4 is a perspective view of one of the "magic T" couplers used in the radar system of FIG. 3; and FIGS. 5A and 5B are vector diagrams illustrating certain voltage relationships in the phase comparison and amplitude comparison systems of FIGS. 3 and 3A, respectively.

Wherever possible, corresponding elements in the several figures of the drawing have been indicated by corresponding reference numerals, and elements having similar functions to those previously described have been indicated by corresponding reference numerals with the suffix letter "a" added.

Radar position tracking systems may generally be divided into two classes, according to the manner in which the echo pulses, reflected from a remote object, are utilized to determine its angular coordinates. The first class to go into general use includes the sequential types of systems in which a plurality of successive echo pulses are required to establish the target position. Lobe-switching and conical-scanning systems are included in this classification. In a well-known form of conical-scanning system, for example, the axis of directivity of a sharply-directive microwave antenna is caused to traverse a conical path as the radar pulses are transmitted and received. If the axis of the cone passes directly through a remote reflecting object, then no periodic change in the amplitudes of successive echo pulses will be observed in the absence of fading. If the axis does not pass through the object, a cyclic variation in the amplitude of the reflected pulses occurs, which can be utilized to provide information as to the angular position of the object with respect to this axis. For further information on a system of this type, reference may be made to Patent 2,412,612 issued Dec. 17, 1946, and to Patent 2,417,248, issued Mar. 11, 1947, both of which were granted to Sidney Godet and assigned to the same assignee as the present invention.

Tracking systems of the sequential type, such as the conical-scanning system, have the advantage that all echo pulses may be passed through a common receiving, amplifying and detecting channel. However, they suffer from two serious limitations:

(1) They are affected by rapid fading variations in the amplitudes of the echoes, due to changes in the aspect of the target and atmospheric factors, requiring the integration of a considerable number of scans for satisfactory operation; and (2) They are quite vulnerable to jamming, for reasons well known to those skilled in the art.

The need for precision tracking of high-speed targets has led to the development of the second general class of position-tracking systems including the simultaneous, or monopulse, types in which each reflected echo pulse is simultaneously received and detected in a plurality of different channels, and utilized to provide complete information on target position and range. For example, one prior-art phase-comparison monopulse system utilizes two pairs of pulse receivers, each receiver having its own antenna. One pair of receivers is utilized to obtain azimuth information, and the other to obtain elevation information. The antennas of each pair are located so that their antenna patterns are substantially coincident, but with one pair spaced apart along a horizontal transverse axis and the other pair spaced apart along a vertical transverse axis. If the antennas of each pair are separated by more than one wavelength at the operating frequency, the difference in phase between the pulses received simultaneously at each pair of antennas can be utilized to provide the desired position information. A simple phase-comparison system of this type, adapted for locating one coordinate of a target, is more fully described, for example, in Patent 2,467,361 issued April 12, 1949 to John T. Blewett, and assigned to the same assignee as the present invention.

Another known form of simultaneous, or monopulse, system is the so-called amplitude-comparison system. This, again, utilizes two pairs of antennas and receivers, but has the antennas effectively located at a common point with their directive axes diverging from the common axis of the array. As is well-known to those skilled in the art, the coordinates of the target may then be determined from a comparison of the relative amplitudes of the echoes received by each pair of antennas.

In either type of monopulse system, the number of receiving antennas and receiver channels may readily be reduced from four to three, by utilizing one antenna and receiver which is common to both pairs, but even so, both types of monopulse systems have heretofore required three separate receiver channels, which greatly increases the complexity of the system as compared to systems of the sequential type. Unless each of the radio frequency amplifiers, and each of the intermediate frequency amplifiers, are very carefully designed and adjusted so as to have a high degree of phase-stability and uniform gain, appreciable tracking errors will be introduced.

My invention is particularly directed to an improved monopulse tracking system in which many of these difficulties are overcome and in which the required number of receiver channels is further reduced from three to two. FIG. 1 illustrates the general principles by which this is accomplished. Let it be assumed that three high-frequency voltages are derived from a radar receiving antenna system: an azimuth error voltage $e_1$, an elevation error voltage $e_2$, and a reference voltage $e_R$. (The manner in which these three voltages are derived in an actual system will be more fully described at a later point in this specification, in connection with FIGS. 3 and 3A.) Let it also be assumed that the voltages $e_1$ and $e_2$ are in phase with each other. As shown in FIG. 1, one of these two voltages, for example, $e_2$, is shifted in phase by means of a 90-degree phase shifter 10 so as to be in precise phase quadrature to $e_1$. These two voltages are then algebraically combined in a transformer 11 having a balanced primary winding 12 and a single-ended secondary winding 13. It will thus be apparent that the resultant voltage $e_D$ across secondary winding 13 is the algebraic difference between two voltages in phase quadrature.

This resultant voltage $e_D$ may now be amplified in a single amplifier 14, which may be termed "the difference amplifier." The reference voltage $e_R$ may also be separately amplified, if desired, in a reference amplifier 15.

The outputs of the two amplifiers 14 and 15 are impressed upon two phase detectors: an in-phase detector 16 and a quadrature-phase detector 17. The detector 16 is designed to produce a unidirectional output voltage whose magnitude is proportional to the in-phase component of the difference voltage with respect to the reference voltage, and whose polarity (positive or negative) depends upon whether that component is in-phase or out-of-phase with the reference voltage. That is, by "in-phase component" is meant a component which has a phase angle with respect to the reference voltage that is any integral multiple of 180 electrical degrees (including zero degrees). The detector 17 similarly produces a unidirectional output voltage having magnitude and polarity proportional only to the quadrature component of the difference voltage from amplifier 14. Various suitable phase detectors for this purpose are known to the art. For example, very suitable detector circuits for high-frequency operation are more particularly shown and described in a copending application, Ser. No. 156,298, filed Apr. 18, 1950 by Robert A. Zachary and John G. Schermerhorn, now Patent No. 2,734,168, issued Feb. 7, 1956, which is assigned to the same assignee as the present invention. These phase detector circuits are also disclosed in FIG. 2 of this application and described briefly at a later point in this specification, for completeness of illustration.

It will thus be apparent, that any phase shift in the difference amplifier 14, or variations in gain, or other instability, will affect both quadrature components of the difference voltage equally, and will thereby have equal effects upon the two unidirectional output voltages. Thus, the desired proportionality between the input voltages $e_1$ and $e_2$ and these output voltages will be continuously maintained, eliminating the difficulties encountered in prior-art systems employing a plurality of separate high-frequency amplifier channels for the error voltages.

FIG. 2 shows in somewhat greater detail those portions of an actual monopulse radar system corresponding to the block diagram of FIG. 1. The radiating antenna system and the servo-mechanism for moving it have been omitted in the interest of simplicity, since these will be discussed in greater detail shortly in connection with FIGS. 3 and 3A. For the time being, it is merely necessary to assume that the three input voltages, $e_1$, $e_2$, and $e_R$ are microwave pulse voltages supplied to the three wave guide sections, 18, 19 and 20 from an antenna feed system, the voltages $e_1$ being an azimuth error voltage, the voltage $e_2$ being an elevation error voltage, and the voltage $e_R$ being a phase reference voltage, as before. Furthermore, it will be assumed for purposes of illustration that these three voltages are in phase, for a certain arbitrarily-selected target position, at a common reference axis 21 through the three wave guide sections.

As is customary in radar systems, the R.F. pulse voltages are first heterodyned down to a convenient intermediate frequency, for example, 30 megacycles, before being further amplified. This is conventionally accomplished in the system of FIG. 2 by supplying the three voltages to crystal diode mixers, where they are combined with R.F. oscillations of the proper frequency, supplied from a common local oscillator 22. Thus, the voltage $e_1$ is supplied to a crystal diode mixer 23, the voltage $e_2$ to a similar diode mixer 24, and the voltage $e_R$ to a balanced mixer circuit comprising a pair of crystal diode mixers 25 and 26.

The desired 90-degree phase shift in the voltage $e_2$ is preferably introduced before detection. This may very simply be accomplished, for example, by making the length of the wave guide section 19 one-fourth wavelength longer than sections 18 and 20, as measured from the reference axis 21 and the respective crystal diodes. Thus, this distance along the wave guide sections 18 and 20 is represented as being $n\lambda_0$, where $n$ is a constant and $\lambda_0$ equals wavelength at the input frequency. The length of wave guide section 19 is then indicated as $n\lambda_0 + \lambda_0/4$ and is represented in FIG. 2 by the curved wave guide section 10a, which is the electrical equivalent of the 90-degree phase shifter 10 of FIG. 1.

The geometry of the wave guide system for feeding voltages from oscillator 22 to the crystal diodes may be entirely conventional, and will readily be understood by those skilled in the art from an inspection of FIG 2. The oscillator voltage is supplied over a first wave guide section 27 to a well-known type of wave guide coupler 28, commonly known to the art as a "magic tee." The physical construction of this coupler is shown in greater detail in FIG. 4. For a detailed explanation of its construction and mode of operation, reference may be made to Patent 2,445,896 issued July 27, 1948 to Warren A. Tyrell. Briefly, if the four arms are designated A, B, S and D, as shown, it can readily be demonstrated that electromagnetic wave energy propagated into either the arm S or the arm D will be divided equally between the arms A and B, none of the energy being propagated into the other arm D or S. Conversely, if two waves of the same frequency are fed into arms A and B respectively, their algebraic sum will appear in the arm S and their algebraic difference will appear in arm D.

At the coupler 28, the oscillator power therefore divides equally between upper and lower wave guide sections 29 and 30. The fourth arm of the coupler is not used in this case, so is merely terminated in conventional manner in a resistance stub 31, such as a carbon block, which provides a proper impedance match.

The wave guide sections 29 and 30 are each similarly terminated in respective "magic tee" couplers 32 and 33. In order that the phase of the oscillator voltages may be the same at the couplers 32 and 33, the lengths of the guide sections 29 and 30 are made to differ from each other by an integral number of wavelengths at the operating frequency. Thus, in FIG. 2 the length of section 29 is indicated as $a$ units and the length of section 30 as $a \pm k\lambda_0$ where $k$ is an integer.

The oscillator voltage at the coupler 32 again divides between upper and lower guide sections 34 and 35, the fourth arm of the T being again similarly terminated in a resistance stub 36. In order to obtain maximum cancellation of "noise" voltage generated in the oscillator, at the input to the intermediate frequency amplifier, the oscillator voltage at the two crystal mixers are caused to be 180° out of phase with each other. This simply requires that the lengths of the guide sections 34 and 35 differ from each other by one-half wavelength. For example, section 34 is indicated in FIG. 2 as having a length $l$, and section 35 as having a length $l \pm \lambda_0/2$.

Those skilled in the art will recognize that the wave guide junction 33 terminates in a balanced mixer circuit at the crystals 25 and 26. Although this arrangement is preferable from the standpoint of noise reduction, it will also be obvious that a single-ended crystal mixer circuit may be employed here.

The detected I.F. voltages appearing at the outputs of crystal diodes 23 and 24 have the same relative amplitudes and phase relationships as the input R.F. voltages, and are therefore also in phase quadrature with respect to input voltages which are in phase at the reference axis 21. These two voltages are differentially combined in the transformer 11, in the same manner as previously described in connection with FIG. 1, and supplied to the difference I.F. amplifier 14a.

The reference I.F. voltage is similarly supplied through a balanced transformer 40 to a reference I.F. amplifier 15a, which corresponds to reference amplifier 15 of FIG. 1. In order to obtain a precise "phasing" adjustment of the system, the phase of the oscillator voltage may be accurately adjusted by means of a vernier phase adjuster 41 located in the wave guide section 30. This is conventionally represented in FIG. 2 as comprising a block 42 of dielectric material which is adapted to be inserted into a slot in the side wall of wave guide section 30 and positioned by means of an adjusting screw 43.

In order to derive error output voltages respectively proportional to the input R.F. error voltages $e_1$ and $e_2$, and in order to determine their phase polarities with respect to the reference voltage $e_R$, I prefer to employ phase detectors of the types more fully described and particularly claimed in the aforesaid copending application of Zachary and Schermerhorn. Such detectors are represented in FIG. 2, the detector circuit 16 being an in-phase detector, and the detector circuit 17 being a quadrature-phase detector. Very briefly, each detector comprises a half-wave transmission line section 50 which is terminated at one end in the plate circuit of an amplifier 51 and at the other end in the plate circuit of an amplifier 52. Each such circuit is properly adjusted to terminate the transmission line section 50 in its characteristic impedance. The amplifiers 51 are energized in parallel from the difference I.F. amplifier 14a and the amplifiers 52 are similarly energized in parallel from the reference I.F. amplifier 15a.

As is more fully explained in the aforesaid Zachary and Schermerhorn application, a standing voltage wave is thereby produced on each transmission line 50, having nodal points determined by the relative phase relation between the two input voltages. In order to measure the in-phase or quadrature-phase components of the input voltage from amplifier 14a, with respect to the input voltage from amplifier 15a, it is only necessary to detect the voltage appearing between two points on the transmission line which are electrically one-quarter wavelength apart. As is shown in FIG. 2, if it is desired to measure the in-phase component, a diode detector circuit 53 is connected to the transmission line 50 at points located symmetrically with respect to the ends thereof. In the quadrature-phase detector 17, the only difference is that a similar diode detector circuit 54 is connected to the transmission line 100 at the mid-point and at one end thereof.

In order to minimize the effects of extraneous noise, the detected in-phase and quadrature-phase voltages are preferably amplified in balanced amplifier systems. Thus, as shown in FIG. 2, the voltages from the balanced detector circuit 53 are amplified in pulse amplifiers 55, 56, while the voltages from balanced detector 54 are similarly amplified in pulse amplifiers 57, 58. The outputs of each pair of amplifiers are then added to provide the resultant pulse error voltage outputs #1 and #2 respectively, as shown.

For reasons that will be apparent to those skilled in the art, a further reduction in the effects of extraneous noise is preferably accomplished by gating the pulse amplifiers 55–58 by means of pulse voltages impressed on terminal 59 from a range gating circuit (not shown). As is well-understood in the art, the amplifiers are thereby caused to be operative only during relatively narrow range gate intervals coinciding with the times of reception of echo pulses from a desired object to be located.

Having thus described these essential circuit features and principles of operation, a complete phase-comparison monopulse radar system will now be described, with reference to FIG. 3. In this figure, those elements which correspond to the same elements in FIG. 2 have been indicated by corresponding numerals to facilitate comparison.

A known form of phase-comparison antenna scanning and tracking mechanism is indicated within the dashed-rectangle 70 in FIG. 3. It comprises a multi-unit antenna array 71 having four antenna units 71a, 71b, 71c and 71d. As shown, each of the antenna units comprises a directive antenna at the focus of a parabolic reflector, and the centers of the units are arranged at the four corners of a square. The spacing between centers is made equal to some suitable distance D which is substantially greater than one wavelength at the operating frequency of the system. The antenna units are rigidly oriented with respect to each other so that their directive antenna patterns are substantially coincident, that is, spaced parallel relationship, and the entire array is supported by a shaft 73 which is journaled in a pair of trunnions 72 for rotation about a horizontal axis. The array and the trunnions are in turn suitably supported for rotation about a vertical axis 74, in order to provide three-dimensional tracking. A suitable elevation tracking motor 75 is provided for rotating the array about its horizontal axis. A similar azimuth drive motor 76 is also provided for rotating the array about its vertical axis, through a pair or reduction gears 77 and 78.

The individual antenna units 71a–71d are interconnected with the remainder of the radar system by means of respective wave guides, indicated only schematically in FIG. 3 by the one-line connections 80, 81, 82, and 83 respectively. For convenience of reference, the radio frequency pulse voltages, which are impressed upon these wave guides as a result of echoes from a remote reflecting object, are indicated as the voltages $e_a$, $e_b$, $e_c$ and $e_d$ respectively. Due to the mechanical and electrical symmetry of the antenna array 71, it will be apparent that all four received voltages (in response to reflection or radiation of a pulse from a remote object) will be equal and in phase when the object is located on the common axis of symmetry for the four antenna patterns. However, for angular displacements of the object off this axis, the phases of these voltages will differ in magnitude and polarity depending upon the magnitude and direction of the displacement.

These received voltages are first algebraically added and subtracted in order to obtain an azimuth error voltage, an elevation error voltage and a reference voltage, by means of four "magic tee" couplers 84, 85, 86 and 87, in a manner now to be described.

Each of the "magic tee" couplers represented schematically in FIG. 3 is constructed as shown in FIG. 4, and the four arms thereof have been correspondingly indicated by the reference letters A, B, D and S. As previously pointed out, if two waves of the same frequency are fed in to the arms A and B respectively, their algebraic sum will appear in the arm S and their algebraic difference will appear in the arm D. This characteristic is utilized to provide a convenient means for combining the voltage waves $e_a$, $e_b$, $e_c$ and $e_d$, in order to derive the desired error and reference voltages. The manner in which the couplers are interconnected, and the resultant sum and difference voltages will readily be apparent upon inspection of FIG. 3. It will be observed that the interconnections are such that the reference voltage supplied to the uppermost wave guide 88 is proportional to the sum of the voltages from all four antenna units. The voltage supplied to wave guide 89 is equal to the difference between the voltages received by the pairs of antennas on the right and left sides of the array, as viewed in FIG. 3, and therefore is proportional to the azimuth angle between the axis of the array and the line of sight to the reflecting target. This resultant voltage is therefore the azimuth error voltage in this system.

Similarly, the resultant voltage supplied to wave guide 90 is equal to the algebraic difference between the voltages received by the upper and lower pairs of antennas in FIG. 3, and thus constitutes an elevation error voltage. The phase polarities of these error voltages with respect to the reference voltage will depend upon whether the reflecting object is above or below, or right or left, of the antenna axis. Consequently, there are available radio-frequency pulse voltages which may be amplified, detected and compared, in accordance with the principles previously explained in connection with FIGS. 1 and 2, in order to locate the target and track it.

The radiated pulse voltages, from which the above echo voltages are derived, may, of course, be supplied from a separate transmitting antenna system. However, as shown in FIG. 3, it will generally be preferable to use the same antenna array for transmitting and receiving. Thus, the transmitting portion of the system may conventionally comprise a pulse transmitter 91 which is modulated by a pulse modulator 92, which in turn is caused to supply pulses to the transmitter 91 under the control of a master pulse synchronizer 93. The high-power radio frequency pulses from transmitter 91 are supplied in conventional manner through an anti-transmit-receive, or A.T.R., device 94 to the wave guide 88. From what has been said above in regard to the characteristics of the "magic tee" couplers 84–87, it will be apparent that this energy is divided among the four antenna units 71a–71d, so that the entire array operates as a single radiating unit.

Since the wave guide 88 is also coupled to the delicate crystal diode mixers 25, 26 of the receiver, it is necessary to protect them from the high-intensity transmitted pulses by means of a conventional transmit-receive, or T.R., device 95. The transmitted pulses are similarly prevented from reaching the sensitive crystals 23 and 24 in the azimuth and elevation channels by means of T.R. devices 96 and 97 respectively.

The functions and operations of the device 94–97 are well-understood in the art and need not be repeated here. For further information, reference may be made to any modern text on radar equipment design, for example, Chapter XI of "Principles of Radar" by the M.I.T. Radar School Staff (McGraw-Hill 1946).

Most of the remaining circuit elements indicated in the upper portion of FIG. 3 have already been described in detail in connection with FIG. 2 and require no further elaboration. The local oscillator frequency is preferably stabilized in conventional manner by suitable automatic frequency control circuits 98 which compare the oscillator output frequency with the frequency of the transmitted pulses and apply a unidirectional control voltage thereto for maintaining the desired difference frequency. The oscillator voltage is thus represented as being supplied to the A.F.C. circuits over a channel 99, and the transmitted pulses are likewise indicated as being supplied thereto through an attenuator 100 and connection 101.

The relationships between various voltages of FIG. 3, for one assumed target position, are indicated in the vector diagram of FIG. 5A. To simplify this diagram, all voltages in the system have been indicated as having the same frequency, which is permissible since the conversion from radio frequency to intermediate frequency does not change the phase relationships. The voltage gains have also been assumed to be unity throughout, since this likewise does not affect the basic phase relationships.

The four antenna input voltages $e_a$, $e_b$, $e_c$ and $e_d$ of FIG. 5A are always of equal magnitudes and symmetrical with respect to their resultant sum voltage $e_R$, due to the symmetry of the antenna array. By making the vector additions and subtractions of these voltages, as indicated in FIG. 3, it will be observed that the azimuth error voltage $e_1$ and the elevation error voltage $e_2$ are in phase and both at 90 degrees to the reference voltage $e_R$. It can readily be shown that this is true of any target position.

In accordance with my invention, one of the two error voltages ($e_2$, in this case) is shifted in phase 90 degrees and then combined with the other error voltage in order to provide the resultant difference voltage $e_D$, as indicated vectorially in FIG. 5A. It will then be obvious that the in-phase component of this voltage, along the vector $e_R$, has a magnitude equal to the elevation error voltage, and that its quadrature-phase component has a magnitude equal to the azimuth error voltage. Therefore, for the phase comparison system of FIG. 3, the elevation phase detector 16 is the in-phase detector, and the azimuth phase detector 17 is the quadrature-phase detector. The resultant unidirectional error voltage outputs from the pulse amplifiers 55, 56 and 57, 58 may be utilized in any suitable servo-control circuits known to the art for readjusting the antenna array in azimuth and elevation, in directions tending to reduce these voltages to zero. This is indicated schematically in FIG. 3 by the connections to the antenna servo-control circuits 102 which have two outputs 103 and 104 to the azimuth and elevation drive motors 76 and 75, respectively. For further details of suitable servo-control mechanisms and circuits, reference may be made, for example, to Chapter XII of the above-mentioned textbook, "Principles of Radar," or to vol. 25 of the Radiation Laboratory Series, entitled "Theory of Servomechanisms," by James, Nichols and Phillips (also published by the Massachusetts Institute of Technology).

The range to the target object may be determined in known manner, by comparing the time phase of the transmitted pulses with the time phase of the received echo pulses at the output of the reference channel. Thus, as shown in FIG. 3, the reference pulses from amplifier 15a are indicated as being supplied to ranging and tracking circuits 105 where they are compared with pulses supplied from the pulse modulator 92 over a connection 92a. The details of design of such circuits are well-known to those skilled in the art and form no part of the present invention. For further information on suitable ranging and tracking circuits, reference may be made to the copending application Ser. No. 543,235, filed July 3, 1944 by Robert L. Sink and assigned to the same assignee as the present invention. On Jan. 1, 1952, the Sink application matured into Patent 2,581,211. The circuits 105 provide the range gate voltage for the gated pulse amplifiers 55, 56 and 57, 58, as previously described in connection with FIG. 2. They may also be applied to suitable range indicating circuits 106 as shown in FIG. 3.

The circuits 105 may also have a third output supplying a gated video voltage which is utilized for automatic gain control of the amplifiers 14a and 15a. Thus, this gated video voltage, as indicated schematically in FIG. 3, is supplied to an automatic gain control detector 107 which impresses A.G.C. potentials upon the several stages of these two amplifiers. These circuits may likewise be conventional. Suitable circuits for this portion of the system are shown, for example, in the copending application Ser. No. 22,421, filed Apr. 21, 1948 by Robert L. Sink, now Patent No. 2,743,355, issued Apr. 24, 1956, and also assigned to the same assignee as the present invention.

FIG. 3A shows a modification of the antenna tracking system of FIG. 3, within the dashed-rectangle 70, which may be substituted to convert the system into a monopulse system of the amplitude-comparison type. As before, corresponding elements have been indicated by corresponding reference numerals. The antenna array differs only in the fact that it comprises four microwave antenna units 120a–120d, which are so closely spaced as to be located substantially at the focus of a common parabolic reflector 121. In accordance with conventional practice in antenna systems of this type, the directive radiation patterns for the four antenna units are not in spaced parallel relationship, as in the phase comparison type of system, but diverge symmetrically from the common axis of symmetry in four quadrants.

Since the four antenna units are effectively located at a common point, the echo voltages from any remote object will always remain in phase, but their magnitudes will depend upon the angular position of the object with respect to the axis of symmetry, by reason of the divergence of the four antenna patterns.

The operation of the remainder of the radar system of FIG. 3, as modified by FIG. 3A, need not be repeated, since it is substantially identical to that previously described. There is only one significant difference, which is illustrated by the vector diagram of FIG. 5B. Like FIG. 5A, this shows the various vector voltages for one assumed target position, and makes the same simplifying assumptions. It will be observed that the error voltages $e_1$ and $e_2$ are again in phase with each other, but in this system they are also in phase with the reference voltage $e_R$. Accordingly, when $e_2$ is shifted 90 degrees, before amplification in difference amplifier 14a, the resultant voltage $e_D$ bears such relationship to the reference voltage $e_R$ that the in-phase component is proportional to the azimuth error and the quadrature-phase component is proportional to the elevational error. Thus, in this type of system the functions of the elevation and azimuth phase detectors 16 and 17 are simply reversed.

It will thus be apparent that my invention is equally applicable to monopulse radar systems of the phase-comparison and amplitude-comparison types. In either case, it allows the two error signals to be amplified simultaneously in the same I.F. amplifier. The advantages of this may be briefly recapitulated as follows:

(1) The system eliminates one I.F. amplifier required by prior art systems, and still allows continuous pulse information to be derived from both the input error channels.

(2) The circuit lends itself to the use of a balanced mixer circuit for combining the two error voltages, which largely eliminates noise frequencies generated in the local oscillator and lying within the receiver pass band.

(3) The radar system is very easy to "phase" and to align. By adjusting the vernier phase shifter 41 (FIGS. 2 and 3) the relative phase of the difference voltage $e_D$ and the reference voltage $e_R$ may be adjusted until the voltages have the proper phase-polarities to cause the tracking antenna system to lock on the target. In practice, the radar system is locked on the target and this phase shifter is then adjusted until the antenna array has no tendency to "circle" the target but remains fixedly directed toward it.

(4) Since the two components of the difference signal traverse the same I.F. amplifier, differences in sensitivity between the two tracking servo-systems, caused by differences in circuit gain, are minimized.

While certain specific embodiments of my invention have been shown and described, it will of course be understood that various other modifications may be made without departing from the principles of the invention. For example, while I prefer to combine the two error signals at intermediate frequency, they may be combined in the radio frequency assembly through the use of a "magic tee" coupler. In this case, the resultant difference voltage would be combined with the oscillator voltage in a single crystal diode mixer, resulting in a somewhat simpler radio frequency assembly and eliminating one of the crystals 23 and 24. However, this would prevent the cancellation of local oscillator noise and would result in a 3 decibel loss over the gain obtainable in the illustrated system. In view of these and other modifications which will readily occur to those skilled in the art, it is therefore to be understood that the appended claims are intended to cover any such modifications within the true spirit and scope of the invention.

What I claim as new and desire to secure by Letters Patent of the United States is:

1. A system for amplifying and translating two independent alternating signal waves having predetermined relative amplitudes and predetermined phases with respect to a third alternating reference wave, comprising means for respectively deriving, from said three waves, first, second and third alternating voltages having a common frequency, said first and second voltages having the same relative amplitudes and phases with respect to said third voltage as the corresponding first and second waves have with respect to said third wave except that the phase relationship of one of said first and second voltages with respect to said third voltage is changed by 90 electrical degrees at said common frequency, means for algebraically combining said first and second voltages to produce a resultant voltage, means for amplifying said resultant voltage means responsive to the in-phase component of said resultant voltage with respect to said third voltage for producing a first output potential whose magnitude is proportional to said last-named in-phase component, and means selectively responsive to the quadrature-phase component of said resultant voltage with respect to said third voltage for producing a second output potential whose magnitude is proportional to said last-named quadrature-phase component, whereby said output potentials are respectively proportional to the amplitudes of said two signal waves.

2. A system for simultaneously amplifying two independent alternating signal voltages in a common amplifier without affecting their relative amplitudes or their phases with respect to a third alternating reference voltage, comprising means for shifting the phase of one of said signal voltages by an odd integral multiple of ninety electrical degrees, means for algebraically combining said shifted voltage with the other signal voltage to produce a resultant voltage, common amplifying means for amplifying said resultant voltage, means comprising an in-phase detector circuit energized from said amplified voltage and said reference voltage for developing a first output voltage proportional only to the in-phase component of said resultant voltage, and means comprising a quadrature-phase detector circuit also energized from said amplified voltage and said reference voltage for developing a second output voltage proportional only to the quadrature-phase component of said resultant voltage.

3. In a radar tracking system comprising a directive antenna system having an axis of symmetry, means for radiating recurrent high-frequency pulses toward a remote reflecting object, means including said system to receive echoes of said pulses from said object in a plurality of signal comparison reception patterns and to derive therefrom two pulse voltages of the same frequency, namely a first voltage having a reference phase and a second voltage having in-phase and quadrature phase components relative to said first voltage which are respectively functions of the azimuth and elevation angles of said object with respect to said axis, a pair of amplifying means for separately amplifying said first and second voltages, means for deriving first and second output signals from said amplified first and second voltages which are functions respectively of said azimuth and elevation angles comprising a pair of phase detectors each energized from both said amplified voltages, one of said detectors responsive to the in-phase component of said amplified second voltage with respect to said amplified first voltage for supplying one of said output signals, and the other one of said detectors responsive to the quadrature-phase component of said amplified second voltage with respect to said amplified first voltage, for supplying the other of said output signals.

4. In an object detection system comprising a directive antenna system having an axis of directivity, means for radiating recurrent energy pulses toward a remote reflecting object, means including said system to receive echoes of said pulses from said object and to derive therefrom three pulse voltages, namely a first voltage having a reference phase and two other voltages having phases relative to said first voltage which are respectively functions of the azimuth and elevation angles of said object with respect to said axis, means to shift the phase of one of said two voltages by ninety electrical degrees, means for algebraically combining said shifted voltage and the other of said two voltages to produce their resultant voltage, phase-stable amplifying means for amplifying said resultant voltage, phase-stable amplifying means for separately amplifying said first voltage, and a pair of phase detectors each energized from both said amplified voltages, one of said detectors being arranged to measure the in-phase component and the other being arranged to measure the quadrature-phase component of said amplified resultant voltage with respect to said amplified reference voltage, whereby the outputs of said detectors are functions of said azimuth and elevation angles.

5. In an object tracking system comprising an antenna array having an axis of directivity capable of being oriented in azimuth and elevation with respect to a remote reflecting object, means for radiating energy pulses toward said object, means for deriving from each echo pulse received at said array a reference pulse voltage and an error pulse voltage having in-phase and quadrature-phase components whose relative amplitudes and phases with respect to said reference voltage are functions of the azimuth and elevation angles of said object with respect to said axis, a pair of phase-stable amplifying means for separately amplifying said reference voltage and said error voltage, a pair of phase-responsive means for separately detecting the in-phase and quadrature-phase components of said amplified resultant voltage with respect to said amplified reference voltage and for producing two unidirectional control potentials respectively proportional thereto, and servo-mechanisms controlled by said control potentials for moving said antenna in azimuth and in elevation in directions tending to reduce said potentials to zero, thereby automatically to orient said axis toward said object.

6. In a monopulse radar tracking system comprising an antenna array having an axis of directivity capable of being oriented in azimuth and elevation with respect to a remote reflecting object, means for radiating high-frequency pulses toward said object, means for deriving from each echo pulse received at said array a high-frequency reference pulse voltage and a pair of high-frequency signal pulse voltages whose relative amplitudes and phases with respect to said reference voltage are functions of the azimuth and elevation angles of said object with respect to said axis, means for shifting the phase of one of said signal voltages by ninety electrical degrees, means for algebraically combining said other signal voltage with said shifted voltage to produce a resultant alternating voltage, a pair of phase-stable amplifiers for separately amplifying said reference voltage and said resultant voltage, a pair of phase detectors for separately detecting the in-phase and quadrature-phase components of said amplified resultant voltage with respect to said amplified reference voltage and for producing two unidirectional control potentials respectively proportional thereto, and servo-mechanisms controlled by said control potentials for moving said antenna in azimuth and in elevation in directions tending to reduce said potentials to zero, thereby automatically to orient said axis toward said object.

7. An arrangement for simultaneously processing a first and second signal having a predetermined phase and amplitude relationship with respect to a third signal, comprising means for displacing the relative phases of one of said first and second signals with respect to said third signals, by an integral odd multiple of 90 degrees, means for simultaneously amplifying said first and second signals in a common amplifying channel, means for separating said first and second amplified signals comprising a phase detector responsive to the in-phase component of said first and third signals, a phase detector responsive to the quadrature phase components of said first and third signals, and means for utilizing said output signals.

References Cited by the Examiner

UNITED STATES PATENTS

| | | | |
|---|---|---|---|
| 2,467,361 | 4/1949 | Blewett | 343—11 |
| 2,480,829 | 9/1949 | Barrow et al. | 343—7 |
| 2,631,279 | 3/1953 | Bollinger et al. | 343—16 |

FOREIGN PATENTS 610,664 10/1948 Great Britain.

CHESTER L. JUSTUS, *Primary Examiner.*

NORMAN H. EVANS, *Examiner.*

M. H. KARR, M. A. MORRISON, T. H. TUBBESING,
*Assistant Examiners.*